United States Patent [19]

Bedford et al.

[11] Patent Number: 4,619,240
[45] Date of Patent: Oct. 28, 1986

[54] FUEL OIL INJECTION ENGINE

[75] Inventors: Timothy J. Bedford, Burton-on-Trent, England; Paul J. O'Sullivan, West Vancouver, Canada

[73] Assignee: Anker Gram & Associates Ltd., W. Vancouver, Canada

[21] Appl. No.: 547,593

[22] Filed: Oct. 31, 1983

[30] Foreign Application Priority Data

Oct. 30, 1982 [GB] United Kingdom ................. 8231093

[51] Int. Cl.⁴ ............................................. F02B 13/00
[52] U.S. Cl. ............................. 123/575; 123/27 GE; 123/304
[58] Field of Search .................... 123/27 GE, 575, 304

[56] References Cited

U.S. PATENT DOCUMENTS

| | | | |
|---|---|---|---|
| 2,708,916 | 5/1955 | Davids | 123/27 GE |
| 2,739,577 | 3/1956 | Moulton | 123/27 GE |
| 2,780,211 | 2/1957 | Davids | 123/27 GE |
| 2,929,366 | 3/1960 | Kotlin et al. | 123/27 GE |
| 2,931,429 | 4/1960 | Brown | 123/27 GE |
| 3,016,886 | 1/1962 | Benz et al. | 123/27 GE |
| 3,406,666 | 10/1968 | Steiger | 123/27 GE |
| 4,416,244 | 11/1983 | McDonald | 123/577 |

OTHER PUBLICATIONS

"Diesel Engineering Handbook" 11th Ed., pp. 288-289, 1963.

Primary Examiner—E. Rollins Cross
Attorney, Agent, or Firm—Neil F. Markva

[57] ABSTRACT

The circulatory fuel oil injection supply system of a diesel engine is adapted so that the engine may be run selectively either in a single fuel mode on diesel oil alone or in a dual-fuel mode on both diesel oil and gas. The control system and fuel system of the engine are modified so that pressure conditions at a diesel oil injection metering device during the single-fuel mode are mimicked by a first flow restrictor during the dual-fuel mode. A pressure sensor measures the mimicked pressure and controls the amount of gas flow to the engine via an electronic programmable control. A shut-off first solenoid valve operative in the single-fuel mode circuit is by-passed in the dual-fuel mode while second and third solenoid valves are operative to open a by-pass line including a second flow-restrictor and to open a reference pressure supply line respectively. A governor control and a throttle control having a by-pass weep line remain operative in both the single-fuel mode and in the dual-fuel mode. In a further modification the first flow-restrictor and third solenoid valve and the second flow-restrictor and the second solenoid valve are replaced by respective pulsed solenoid valves providing variable flow-restrictors so as to allow a variable amount of pilot diesel fuel oil to be supplied in the dual-fuel mode via the electronic control.

42 Claims, 6 Drawing Figures

FUEL OIL INJECTION ENGINE

FIELD OF THE INVENTION

This invention relates particularly but not exclusively to a fuel oil injection engine of a type in which the amount of fuel oil injected into the engine varies with the pressure in the fuel oil supply line. Such an engine may be a compression ignition or diesel engine. This invention is also particularly but not exclusively concerned with adapting existing diesel engines to run as dual-fuel engines able to use a gas or mixture of gaseous substances as the main fuel.

BACKGROUND OF THE INVENTION

Dual-fuel engines are known in which the main fuel is typically natural gas with diesel oil used as the secondary fuel, especially as pilot fuel to control burning and to initiate and stabilize ignition. In the design of liquid fuel injection systems, there are many technical problems embracing such matters as providing suitable pumps, spray nozzles, and combustion chambers for the delivery, atomization and burning of the fuel in hot compressed air. Suitable fuels must be carefully chosen with due regard for such factors as viscosity, flash point, pour point, ash, sulphur content, basic sediment, water, Conradsen carbon number, cetane number, and diesel index. In designing dual-fuel engines additional problems arise, and this is particularly true when a dual-fuel engine is to be provided by adapting and converting an existing standard diesel engine.

An object of the present invention is to provide a dual-fuel engine in which at least some of the design problems and technical difficulties associated therewith are alleviated.

SUMMARY OF THE INVENTION

According to one aspect of the present invention, a dual-fuel fuel oil injection engine comprises a fuel oil injection supply line to one or more combustion chambers of the engine. The fuel oil injection supply line is connected into a fuel oil circulatory system which includes a fuel oil throttle control of the engine and a fuel oil reference supply line is connected as part of the circulatory system downstream of the throttle control. A flow restrictor is connected in the reference supply line with sensor means being responsive to pressure in the reference supply line. A gaseous fuel supply system includes gaseous fuel supply regulator means to inject pilot shots of fuel oil into said one or more combustion chambers in synchronized manner with injector means from said injection supply line and to cause the pressure in the reference supply line to vary according to engine speed and throttle control setting. The sensor means applies the varying pressure in the reference supply line between the throttle control and restrictor to control the setting of said regulator means and thereby vary the amount of gas supplied to said combustion chamber or chambers for ignition by the pilot shots of fuel oil.

According to a second aspect of the present invention, a dual-fuel fuel oil injection engine is adpated for selective running on the fuel oil as a sole fuel in a single-fuel mode or on fuel oil and on gas in a dual-fuel mode. This engine comprises a circulatory fuel oil supply system, pump means to circulate the fuel oil around the supply system, an engine driven governor control connected in said fuel oil supply system upstream of a throttle control which is in turn upstream of a first flow control valve which is in turn upstream of a metering device for metering the amount of fuel oil injected into one or more combustion chambers of the engine. The arrangement being such that when said first flow control valve is open, in use fuel oil is supplied to the metering device under pressure which is a function of the governor control speed and of the throttle control setting. The amount of fuel oil injected into said combustion chamber or chambers is dependent upon said pressure and upon engine speed during the single-fuel mode of the engine. The circulatory fuel oil supply system also has a by-pass line which includes a second flow control valve and which by-passes the first flow control valve in to allow fuel to flow through to said metering device when said first flow control valve is shut off or inoperative and when the second flow control valve is opened for running the engine in its dual-fuel mode. The circulatory fuel oil supply system further comprises a reference supply line which is connected from a point downstream of the throttle control to a point downstream of the metering device and which includes a third flow control valve and metering device mimic means operative in the dual-fuel mode such that said mimic means is effective to mimic or simulate in the reference supply line the pressure conditions set up downstream of the first flow control valve by the metering device when operating in the single fuel mode. The engine also includes sensor means responsive to the pressure in the reference supply line and arranged to control in accordance with said pressure the amount of gas supplied to said combustion chamber or chambers, during the dual-fuel mode, for ignition by pilot fuel oil shots injected by way of the by-pass line and through the metering device.

According to a third aspect of the present invention there is provided a method of adapting a diesel engine to run as a dual-fuel engine. The diesel engine is a type which has a circulatory fuel oil injection supply system, for example a "Cummins" diesel engine having a "PT" fuel injection system. The diesel engine further is type having an engine driven governor control arranged to vary the pressure in the circulatory fuel oil injection supply system in accordance with engine speed. The governor control is connected into the circulatory system upstream of a throttle control and a first valve means. The first valve means is operative to allow fuel oil to be supplied under pressure to a metering device of the engine which injects fuel oil into a combustion chamber or chambers of the engine. The pressure is a function of the engine speed (by way of the governor control) and of the throttle setting so that the greater the throttle setting the more fuel oil is injected into the combustion chamber or chambers. The method comprises (a) installing a by-pass line including second valve means in the circulatory supply system so as to by-pass the location of the first valve means in the supply system so that with the second valve means operative fuel oil can pass through said by-pass line to the metering device of the engine to provide pilot shots of fuel oil in the dual-fuel mode of operation;

(b) installing downstream of the throttle control and upstream of the location of the first valve means a reference supply line including third valve means and metering device mimic means which, during dual fuel operation of the engine, mimics the varying pressure conditions developed at the metering device which previously took place while running the diesel engine before adaptation to a dual-fuel engine; and (c) connecting the diesel engine to a gas supply through gas supply control means arranged to be responsive to the pressure developed in the reference supply line in the dual-fuel mode thereby to control the amount of gas fed to the combustion chambers or chambers for ignition by the pilot fuel oil injected therein.

By the third aspect of the present invention according to the immediately preceding paragraph the diesel engine may either be permanently adapted to a dual-fuel system or alternatively the adaptation may include a selection control so that the diesel engine is adapted to be switched from a single-fuel mode to a dual-fuel mode at will. Where these adaptation is to all intents and purposes permanent (although it could be reversible) the first valve means may be disconnected from its position in the circulatory supply system before adaptation and used to provide one of the second and third valve means in order to reduce the overall costs of adaptation.

For operation during tick-over, the throttle control may be by-passed by a weep line controlled by the governor control. The term "tick-over" as used herein is of course synonomous with "idle" or "idling".

The metering device and the governor control may both be controlled by the speed of the engine so that approximately the same mass of pilot fuel oil for ignition in the dual-fuel mode is injected into the combustion chamber or chambers regardless of the engine speed. The metering device may in some embodiments be a fixed or variable device.

Pilot fuel oil injected may be in the range 0.75%–5% of the total fuel input but could be as much as 16%.

The fuel gas may be any appropriate gas such as natural gas, for example, methane or liquefied natural gas (LNG).

It is a significant feature of the invention that in dual-fuel operation the air/fuel gas ratio is controlled by the fuel oil injection system, and preferably this ratio is adjusted just by controlling the gas flow rather than by throttling the air intake and trying to ensure that the air/fuel ratio is within accepted stoichiometric limits. It is believed that some embodiments of the engine in accordance wtih the invention could run on extremely weak air/fuel gas mixtures, even mixtures having an air/fuel gas ratio of the order of 50:1 which is way outside the accepted stoichiometric ratio by a factor of five or six.

It will be appreciated that in a compression ignition engine running on natural gas fuel which comprises mainly methane, the temperature due to compression on the compression stroke of the engine is generally lower than the ignition temperature of methane (600° C.) and so the fuel oil injection is needed to provide a pilot or booster shot of ignition fuel oil to ignite the gas.

The engine may be a diesel reciprocating engine or alternatively a Wankel-type diesel engine.

Still further according to the present invention there is provided a method of adapting a single-fuel mode fuel oil injection engine in which the amount of fuel oil injected into the engine varies with the pressure in a fuel oil supply line of a fuel oil circulatory system. The pressure varies in accordance with a throttle control setting and the fuel oil is injected by a metering device which meters different amounts of fuel oil into a combustion chamber or chambers of the engine in accordance with the pressure in the fuel oil supply line. The method comprises adapting the engine to run in a dual-fuel mode by providing means for said fuel oil to be supplied to the metering device through alternative flow control means operative in the dual-fuel mode and by connecting into the circulatory system a reference supply line which is adapted to provide for close mimicking in the dual-fuel mode of the effect of the fuel flow constraints imposed by the metering device in the single-fuel mode, and utilizing the pressure in the reference supply line to control the amount of gas supplied to the combustion chamber or chambers for ignition by pilot shots of fuel oil fed by way of the metering device into said chamber or chambers and supplied by way of said alternative flow control means so that the engine is adapted to run in a dual-fuel mode. The engine may be arranged to selectively run in the dual-fuel mode and single-fuel mode or not as required. The alternative flow control means may be provided by a by-pass line including flow restrictor means by-passing shut-off control valve means in a section of the fuel oil supply line utilized in the single-fuel mode.

In one embodiment the by-pass line also by-passes the throttle control and the engine may include a further fluid supply line, connected into the circulatory system, which includes a non-return valve (and possibly a flow restrictor) allowing fuel oil to flow from the by-pass line to the reference supply only.

Most importantly, still further according to the a present invention there is provided generally a method of adapting a fuel injection engine, for example a diesel engine, to run in a dual-fuel mod on a gaseous main fuel such as natural gas and also on fuel oil. This method comprises:

(a) modifying the existing fuel oil injection supply system and arranging for at least part of the existing fuel oil injection supply control system to be usable, in use in the dual-fuel mode, to control the amount of main fuel supplied to a combustion chamber or chambers of the engine; and (b) also modifying the existing fuel oil injection supply system and arranging for at least part of the existing fuel oil injection supply control system to be usable, in use in the dual-fuel mode, to provide pilot shots of fuel oil which are fed to the combustion chamber or chambers, to ignite the main fuel supplied to said combustion chamber or chambers.

Means are preferably provided whereby the amount of main fuel supplied to the combustion chamber or chambers is controlled in accordance with the pressure developed in said modified fuel oil injection supply system.

In practice, the existing fuel oil injection supply system may be modified both by providing a reference supply line and by providing a by-pass supply line. The reference supply line and by-pass supply line may have a common branch and therefore be combined together. The reference supply line and/or the by-pass supply line may include a flow restrictor which may be a variable restrictor.

The part of the existing control system which is used in the dual-fuel mode may comprise an existing engine driven governor control and/or a throttle control and/or an existing fuel oil metering device and/or an existing solenoid valve device.

The fuel injection engine modified may be a "Cummins" fuel injecton engine.

The present invention also provides a vehicle having at least one engine as defined in any one of the statements of invention herein contained.

The invention also includes a kit of parts for use in adapting a diesel engine to run as a dual-fuel engine in accordance with any respective statement of invention herein contained.

Still further according to the present invention there is provided a dual-fuel fuel oil injection engine comprising a fuel oil injection supply line to one or more combustion chambers of the engine. The fuel oil injection supply line is connected into a fuel oil circulatory system downstream of a fuel oil throttle control of the engine. A fuel oil reference supply line is connected downstream of the throttle control and as part of the circulatory system and a flow restrictor is connected in the reference supply line. Thus, pilot shots of fuel oil are injected into said one or more combustion chambers in synchronized manner by said injection supply line and by pump means and the pressure in the reference supply line varies according to engine speed and throttle control setting. The varying pressure in the reference supply line between the throttle control and restrictor is used to vary, by sensor means of the engine, the amount of gas supplied to said combustion chamber or chambers for ignition by the pilot shots of fuel oil.

The flow restrictor may be variable. A flow restrictor may be provided in the injection supply line and this may be variable.

Further according to the present invention there is provided a dual-fuel oil injection engine adapted for selective running on the fuel oil as the sole fuel in a single-fuel mode or on fuel oil and on gas simultaneously in a dual-fuel mode. The engine comprises a circulatory fuel oil supply system, pump means to circulate the fuel oil around the supply system, a governor control drivable from a moving part of the engine and connected in said fuel oil supply system upstream of a throttle control which is in turn upstream of a first solenoid valve which is in turn upstream of a metering device for metering the amount of fuel oil injected into one or more combustion chambers of the engine. Upon operation of said first solenoid valve, fuel oil is capable of being supplied to the metering device under pressure which is a function of the governor control speed and of the throttle control setting. The amount of fuel oil injected into said combustion chamber or chambers is dependent upon said pressure and upon engine speed during the single-fuel mode of the engine. The engine further comprises a by-pass line in the circulatory fuel oil supply system. The by-pass line is connected downstream of the throttle control but upstream of the first solenoid valve, and downstream of the first solenoid valve and upstream of the metering device, to allow fuel to flow through the by-pass line by-passing the first solenoid valve when said first solenoid valve is shut-off and when a second solenoid valve in the by-pass line is operative while running the engine in its dual-fuel mode. The engine further comprises a reference supply line connected downstream of the throttle control and downstream of the metering device, a third solenoid valve being provided in the reference supply line. The second and third solenoid valves provide variable flow restrictors and are electrically pulsable in co-operative manner. The third solenoid valve provides metering device mimic means which in use in the dual-fuel mode is effecctive to produce mimicking of the pressure conditions set up by the metering device in the single-fuel mode. The reference supply line is connected to sensor means responsive to the pressure in the reference supply line to thereby control the amount of gas supplied to said combustion chamber or chambers, when said third solenoid valve is operative during the dual-fuel mode, for ignition by fuel oil injected by way of the by-pass line when the second solenoid valve is operative and through the metering device. Thus, in the single-fuel mode, the first solenoid valve is operative with the second and third solenoid valves shut off, and during the dual-fuel mode the engine operates with the first solenoid valve shut off and the second and third solenoid valves operative. The second solenoid valve is pulsable to allow a variable amount of fuel oil to be injected into said combustion chamber or chambers to vary the ratio of gas supplied to the chamber or chambers to fuel oil, and the third solenoid valve is pulsable in co-operation therewith to maintain said mimicking.

Further according to the present invention there is provided a method of adapting a diesel engine to run as a dual-fuel engine. This said diesel engine is of a type which has a circulatory fuel oil injection supply system, for example a "Cummins" diesel engine having a "PT" fuel injection system. The diesel engine further is of a type having an engine driven governor control arranged to vary the pressure in the circulatory fuel oil injection supply system in accordance with engine speed. The governor control is connected into the circulatory system upstream of a throttle control and a first valve means. The first valve means is operative to allow fuel oil to be supplied under pressure to a metering device of the engine which injects fuel oil into a combustion chamber or chambers of the engine. The pressure is a function of the engine speed (by way of the governor control) and of the throttle setting so that the greater the throttle setting the more fuel oil is injected into the combustion chamber or chambers. The method comprises:

(a) installing a by-pass line and second valve means in the circulatory supply system so that with the first valve means shut-off and with the second valve means operative fuel oil can by-pass the first valve means to the metering device of the engine;

(b) installing a reference supply line downstream of the throttle control and upstream of the first valve means and installing third valve means providing metering device mimic means which, during dual-fuel operation of the engine, is effective to mimic the varying pressure conditions developed at the metering device which previously would have taken place while running the diesel engine before adaptation to a dual-fuel engine, said second valve means providing a variable flow restrictor and being electrically pulsable to vary the amount of fuel oil fed to said combustion chamber or chambers and said third valve means also providing a variable restrictor and being pulsable in co-operation with said second valve means;

(c) connecting the diesel engine to a gas supply through gas supply control means arranged to be responsive to the pressure developed in the reference supply line in the dual-fuel mode thereby to control the amount of gas fed to the combustion chamber or chambers for ignition by the fuel oil injected therein so that the diesel engine runs as a dual-fuel engine.

According to the immediately preceding paragrah the diesel engine may be either permanently adapted to a dual-fuel system or the adaptation may alternatively include a selection control which enables the diesel engine to be switched from a single-fuel mode to a dual-fuel mode at will. Where the adaptation is intended to be permanent (although it could be reversible) the first valve means may be disconnected and removed from the circulatory supply system before adaptation. Even if a permanent adaptation is not required, it may still be possible to remove the first valve means if the second valve means has an operating range sufficient to open fully without flow restriction, in which case it may take over the function of the first valve means when the engine is in single-fuel mode operation.

Where the engine is operative both in single-fuel mode and in dual-fuel mode it may have a weep-line for the fuel oil which is operative during tick-over or idling in the single-fuel mode, the weep line being rendered inoperative during speed above tick-over. The weep line may be between the first solenoid or first valve means and the governor control.

Still further according to the present invention there is provided a method of adapting a single-fuel mode, fuel oil injection engine in which the amount of fuel oil injected into the engine varies with the pressure in a fuel oil supply line of a fuel oil circulatory system which includes a shut-off valve. The pressure varies in accordance with a throttle control setting and the fuel oil is injected by a metering device which meters different amounts of fuel oil into a combustion chamber or chamber of the engine in accordance with the pressure in the supply line. The method comprises adapting the engine to run in a dual-fuel mode by providing by-pass means to allow the fuel oil to by-pass the shut-off valve, and connecting a reference supply into the circulatory system which is arranged to produce a close mimicking in the dual-fuel mode of the effect of the fluid flow pressure constraints caused by the metering device in the single-fuel mode, and utilizing the pressure in the reference supply line to control the amount of gas supplied to the combustion chamber or chambers for ignition by pilot shots of fuel oil fed by the metering device into said chamber or chambers and by said bypass so that the engine is adapted to run in a dual-fuel mode. The engine may be arranged to selectively run in the dual-fuel mode and single-fuel mode or not as required.

A system is envisaged according to the present invention whereby a variable amount of fuel oil may be delivered to a combustion chamber or chambers of the engine on dual-fuel running by a variable flow restrictor in a supply line or by-pass line to the metering device, while maintaining said mimicking effect. Importantly, this allows the setting of the percentage of fuel oil to main fuel to be altered while the engine is running. In this way, it is possible to optimize the amount of fuel oil used in respect of emissions, horsepower and detonation limits. Such a variable flow restrictor may be controlled by electronic control means and may comprise a pulsable solenoid valve.

The amount of gas fed to a combustion chamber or chambers of the engine may be controlled electronically by a signal derived from the pressure in the reference supply line or by any other convenient means. Such electronic control means may be programmable and responsive to one or more measured variable engine parameters. Where the amount of fuel oil delivered is variable by a variable restrictor comprising a pulsed solenoid valve, the program may include information to optimize engine running conditions based on pulsing said valve to deliver the precise amount of fuel oil required for specific running conditions while taking into account the pressure in the fuel supply system.

Obviously different engines may need different running conditions but facility may be made for providing interchangeable electronic memories containing the relevant information.

BRIEF DESCRIPTION OF DRAWINGS

An embodiment of a dual-fuel injection engine in accordance with the present invention will now be described, by way of example only, with reference to the accompanying much simplified schematic drawings in which.

DETAILED DESCRIPTION

Figure 1:
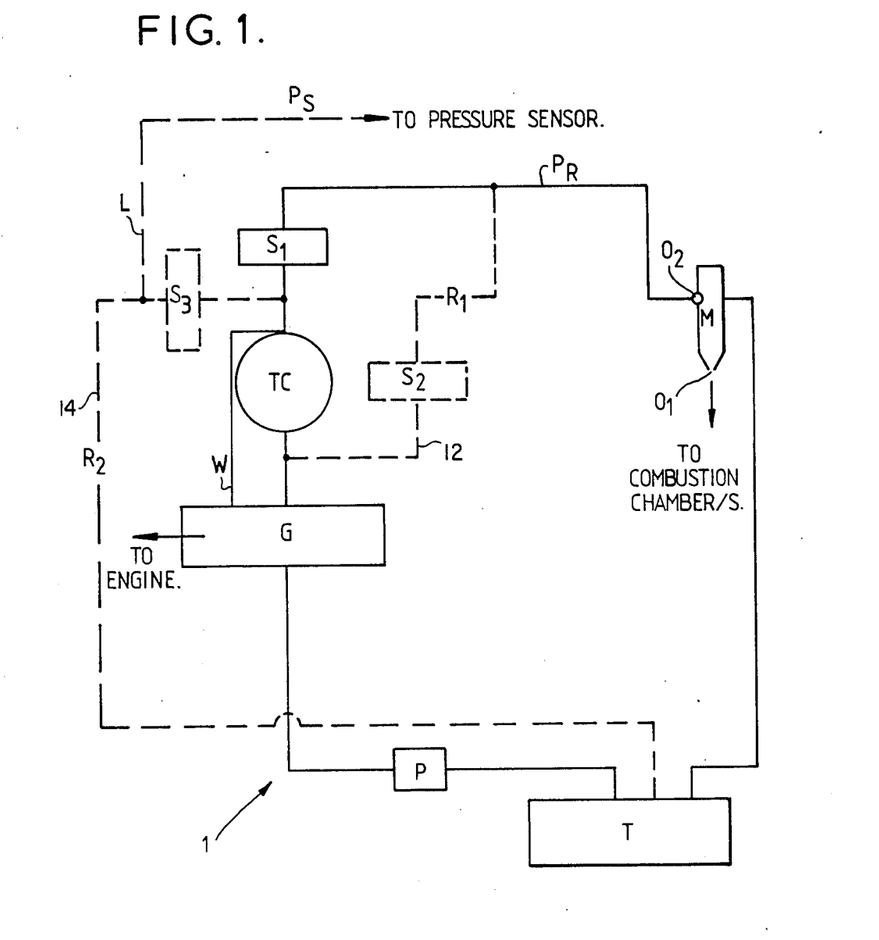
FIG. 1 shows a circulatory fuel oil injection supply system of the engine.

FIG. 1 relates to one example of a dual-fuel injection engine and shows a circulatory fuel oil injection supply system 1. The fuel oil in this example is diesel oil.

In this example the engine may be run selectively either in a mode on diesel oil alone or in a dual-fuel mode on both oil and a main gas fuel. The diesel oil is injected into combustion chambers of the engine as a pilot fuel and the main gas fuel has a relatively high ignition temperature, for instance natural gas which is composed principally of methane.

During the mode, the sections of the fuel oil injection supply system shown in dashed lines in FIG. 1 are not utilized. Without these sections shown in the dashed lines, the injection system is of a kind known per se, such as the "Cummins PT fuel injection system" of which an example is shown in more detail in FIG. 6.

The injection supply system of FIG. 1 includes a tank T for containing diesel fuel oil which is driven around the system by pump means P in the form of a gear type pump driven by the engine. A damper (not shown) may be employed to inhibit fluctuations of pressure caused by the pump P.

Figure 6:
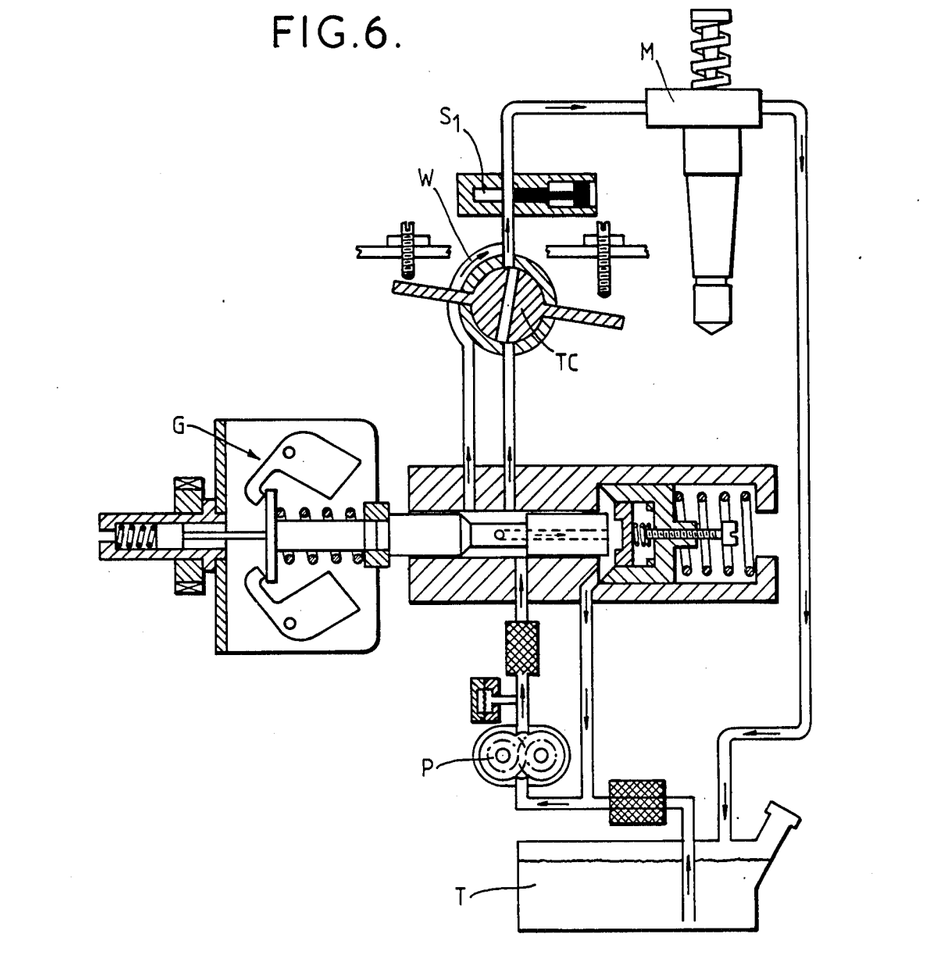
FIG. 6 shows a basic sectional representation of a typical Cummins fuel oil injection supply system in more detail.

Fuel oil from the tank T is drawn to a centrifugal governor control G having a valve assembly which in this example is a spool valve assembly (see FIG. 6). The governor control G is driven by the engine and control the pressure of fuel oil fed to a throttle control TC in accordance withh engine speed.

A solenoid shut-off valve $S_1$ is connected downstream of the throttle valve and upstream of the fuel oil injectors (one for each cylinder) which each include a high pressure plunger pump operated from an engine driven camshaft and which collectively can be regarded as providing a fuel oil metering device M. The injectors in a multi-cylinder engine are of course connected in parallel in the injection supply system, but for simplicity only one fuel oil injector metering device M which represents all the injectors is shown in FIG. 1. From the injector metering device M, a common fuel return line lead back to the tank T.

The sections shown in the dashed lines are used in dual-fuel running of the engine as aforesaid and consist of, firstly, a by-pass line 12 around solenoid valve $S_1$ and, secondly, a reference pressure supply line 14. The by-pass line 12 has a second solenoid valve $S_2$ connected upstream of a flow restrictor $R_1$, and is connected at one end in between the throttle control TC and the governor control G and, at its other end, in between the first solenoid valve $S_1$ and the injector metering device M. The main purpose of this by-pass line 12 is to maintain a supply of fuel oil to the injector metering device M for providing the shots of pilot fuel required for igniting the fuel gas mixture in the cylinders under dual-fuel operation. The reference supply line 14 includes a third solenoid valve $S_3$ connected upstream of a second flow restrictor $R_2$ and is connected at one end in between the first solenoid valve $S_1$ and the throttle control TC and, at its other end, back to the fuel tank T. Flow restrictors $R_1$ and $R_2$ may be in the form of venturis in this example. A pressure sensor (not shown in FIG. 1) is also connected to the reference pressure supply line 14 by a pressure line L taken from in between solenoid $S_3$ and restrictor $R_2$. This pressure sensor is used to control the amount of gas supplied to the combustion chambers of the engine during the dual-fuel mode in response to the pressure ($P_S$) in the reference pressure supply line 14 utilizing any convenient control means, for example, electronic control means responsive to signals from the pressure sensor.

In operation during the single-fuel mode, the engine operates normally as a diesel engine and solenoid valves $S_2$ and $S_3$ are shut off so that fuel oil does not flow in either the bypass line 12 or reference supply line 14; solenoid valve $S_1$ is open, and fuel oil circulates via the pump P from tank T through the valve assembly of the governor control through the throttle control to the injector metering device M.

In this example, at low throttle settings the spool valve of the governor control G opens weep line W which by-passes the throttle control TC so that some fuel oil passes through to allow idling or tick-over of the engine.

The fuel oil passing to the injectors constituting the injector metering device M enters inlet orifice $O_2$ which forms a further flow restrictor, and a metered amount of fuel oil is fed to the combustion chambers of the engine per injection stroke through a fixed injection metering orifice $O_1$ of the metering device M. The quantity of fuel injected into each cylinder of the engine is determined by the pressure at which fuel is supplied to the injector metering device M, i.e. the rail pressure ($P_R$) in the supply line at the inlet orifice $O_2$, and by the length of time for which a metering port associated with the metering orifice $O_1$ is open, this latter being controlled by the movement of the injector pump plunger (not shown) and hence by the speed of the engine.

The pressure in the supply line to the injector metering device M is varied by the governor control G (varies approximately in accordance with the square of the engine speed within the operational range of the engine) and by the setting of the throttle control TC, while the torque output of the engine, in the single-fuel mode at constant speed, varies almost linearly with the rate of the fuel flow which in turn varies approximately as the square root of the pressure of the fuel supplied at the restrictor inlet orifice $O_2$.

As the throttle TC is opened the engine speed increases, thereby also increasing the speed of the centrifugal governor G and causing the spool valve of the valve assembly of the governor G to move and close off the weep line W while leaving the main line from the spool valve to the throttle control TC open. To stop the engine the solenoid valve $S_1$ is shut off. The governor control G also limits the maximum operating speed of the engine by closing the main line to the throttle control TC at a critical predetermined speed.

A switch (not shown) is provided to switch the running of the engine over to a dual-fuel mode from the single fuel mode or vice versa and this switch may be provided, for example, on the control panel of a vehicle including the engine.

In the dual-fuel mode, solenoid valve $S_1$ is inoperative (closed), solenoid valve $S_2$ is operative (open), and fuel oil flows by way of the bypass line 12 (bypassing the throttle control TC and the solenoid valve $S_1$) to the metering device M. For idling or tick-over of the engine, with the throttle control closed restrictor $R_1$ then allows approximately enough fuel oil for the engine to tick over at normal tick-over speed.

Also, in the dual-fuel mode, solenoid valve $S_3$ is operative (open) so that fuel oil flows into the reference supply line 14 and pressure builds up therein because of restrictor $R_2$. This pressure depends on the setting of the throttle control TC and on the flow restriction characteristics of restrictor $R_2$. These flow characteristics of restrictor $R_2$ are especially chosen so that the flow restriction characteristics of the metering device M in respect of the flow of fuel oil therethrough are closely mimicked or simulated whereby the varying pressures in line L, fed to the pressure sensor for regulating the fuel gas supply, are substantially the same as the pressures developed just upstream of the metering device M during the single-fuel mode for corresponding throttle control settings and engine speeds.

Pressures sensed by the pressure sensor in this way are used to control, conveniently by way of electronic control means (see FIG. 5), the amount of fuel gas supplied to the combustion chambers for ignition by the pilot fuel oil injected by way of the metering device.

If the engine is to operate solely in a dual-fuel mode, solenoid valve $S_1$ is redundant since it is only used as a blocking valve or stop control in the supply line during single fuel normal diesel operation. It could be removed from the system.

It is to be appreciated that many refinements may be made to the system as described, but an important aspect is the utilization of the pressure of the fuel oil supply to control the fuel gas input to the engine, and also the simulation or mimicking in the reference pressure supply line 14 of the flow restriction characteristics of the metering device M whereby the throttle control can operate with a similar effect and characteristics as in single-fuel normal diesel mode.

Figure 2:
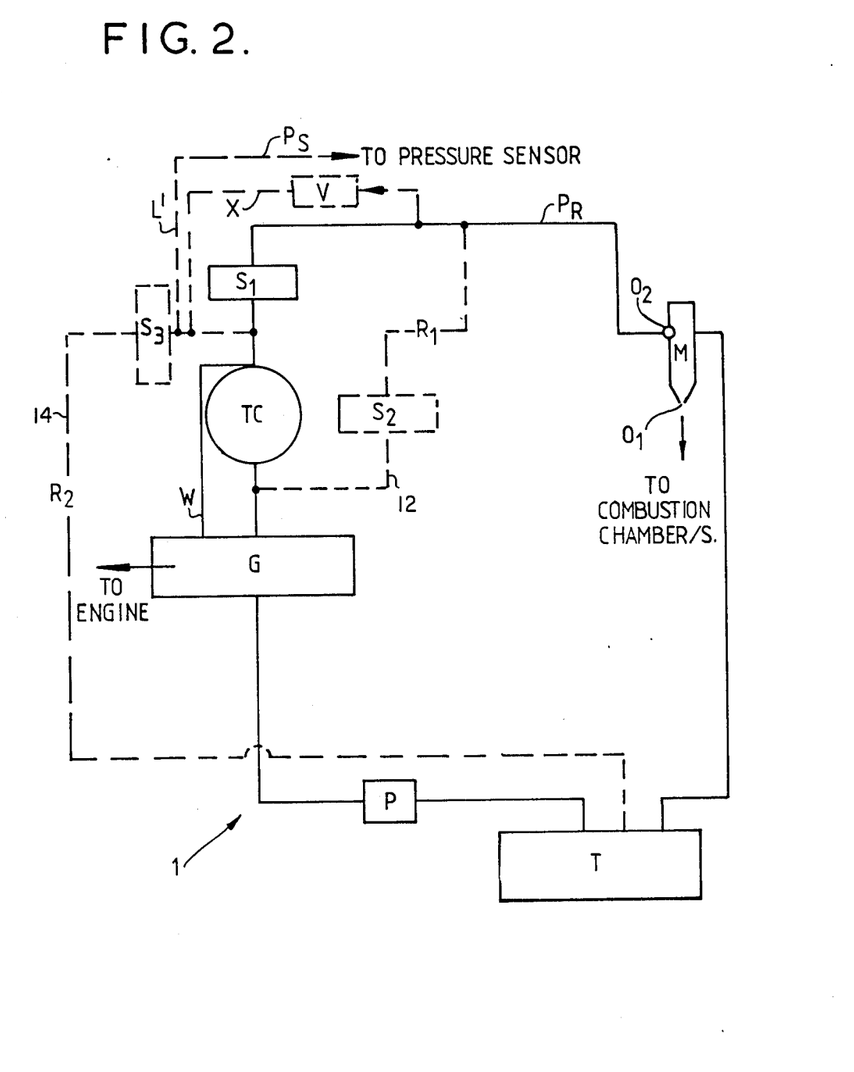
FIG. 2 shows a modified version of the fuel oil injection supply system.

In the modification of FIG. 2, the arrangement is similar to FIG. 1 except that line L' replaces line L and an additional fluid supply line X has been connected into the system.

In the FIG. 1 arrangement the pressure in the reference supply line 14 is generally always greater than the pressure in the by-pass line 12 except on the over-run when the throttle valve TC is closed and the weep line W is also closed off (by the governor G). In this situation the pressure in the reference supply line 14 will drop suddenly, stopping the supply of fuel gas. With the bypass line 12 in operation in the dual-fuel mode and with no gas going into the combustion chamber or chambers, however, the engine may still take a considerable time to slow down because of high pressure generated in the fuel oil supply line via the by-pass line 12 at higher engine speeds. Such high pressure is required to ensure that there is sufficient fuel oil injected at high speeds to ignite the gas/air mixture in the combustion chamber or chambers, but on shut down and, most importantly, when closing the throttle in changing gear the engine may decelerate too slowly to suit all requirements. Therefore, advantageously, fluid supply line X has been connected in the supply system of FIG. 2.

Fluid supply line X has a non-return valve V which allows fuel oil to flow only in the direction shown i.e. from the bypass line 12 to the reference supply line 14. This can only occur on the overrun and it then has the effect of quickly lowering the pressure in the by-pass line 12 and reducing the fuel oil flow so as to decrease the time in which the engine slows down while the electronic control will have shut off the gas supply.

In yet another modification of the FIG. 2 arrangement a further flow restrictor may be positioned in between the non-return valve V and the connection of the fluid supply line X into the existing circulatory system. This is to help smooth out fluctuations which may occur in some systems.

In the systems so far described in connection with FIGS. 1 and 2, wherein the by-pass line 12 for supplying the pilot fuel oil to the injectors or metering device M in the dual-fuel mode is connected to a point intermediate the governor control G and the throttle control TC, the pressure of the fuel oil in the line leading to the inlet orifice $O_2$ is independent of the throttle control setting but is varied by the governor control G. Since the latter, at least in most Cummins PT type systems, generally controls the output pressure so that it is approximately proportional to (engine speed)$^2$, and since the quantity of fuel oil injected on each injection stroke is approximately proportional to the square root of the supply pressure and inversely proportional to the engine speed, the amount of pilot fuel injected in each shot remains approximately constant throughout the speed range of the engine and is predetermined by the flow restriction characteristics selected for the fixed flow restrictor $R_1$. In practice, for a convertible engine the latter may conveniently be chosen so as to give about 5% of the maximum value of the flow to the injectors which takes place when operating in the normal diesel single-fuel mode.

Although systems with the above arrangement can be quite satisfactory, certain disadvantages arise in some cases. For example, when dealing with the conversion of existing compression ignition or diesel injection fuel engines, it will sometimes be found difficult with the design of existing models of fuel pumps to connect in the by-pass line to a point between the governor control and throttle control. Also, it may be difficult to maintain a constant idling speed unless some additional means is provided for governing the fuel oil or gas supplied under idling conditions.

These and other possible disadvantages of providing for a fixed predetermined amount of pilot fuel to be injected over the whole speed range, as in the systems described in relation to FIGS. 1 and 2, may however be overcome by further modifications which provide for the possibility of a variable amount of pilot fuel, and this latter possibility can also lead to additional advantages in some situations.

One such further modification is the arrangement illustrated in FIG. 3 which shows a typical installation of variable pilot fuel adaptation according to the present invention, applied as a conversion to the Cummins or PT type of fuel system, and this will now be briefly described with reference to the drawings in which like references to those used in FIGS. 1 and 2 indicate corresponding parts.

Under normal 100% diesel operation (single fuel operation) solenoids SRA and SRB are de-energized (closed) and solenoid $S_1$ is energized (open). The solenoids SRA and SRB in this arrangement are effectively variable flow metering valves, and are driven electrically by a constant frequency variable mark/space ratio waveform. The pulsating output from these valves may be hydraulically integrated to give a steady flow proportional to the applied mark/space ratio waveform.

Referring back to FIG. 3, when operating in the dual-fuel mode solenoid $S_1$ is de-energized and solenoids SRA and SRB are driven with the correct waveforms.

Figure 4:
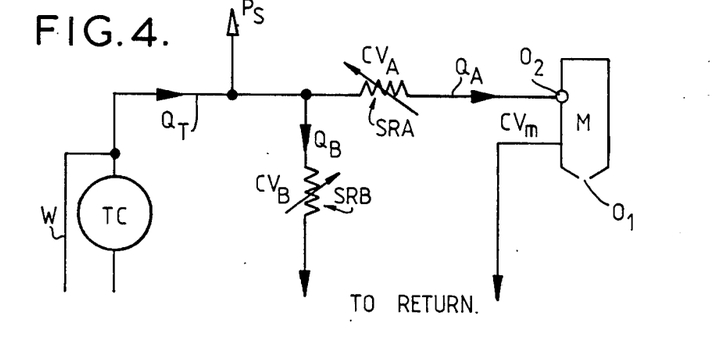
FIG. 4 shows a simpler diagrammatic representation of the system of FIG. 3.

FIG. 4 is a simpler diagrammatic representation of this variable pilot diesel system to illustrate the principle of operation. In this diagram solenoids SRA and SRB have been diagrammatically depicted as equivalent variable restrictors.

The basic principle of operation relies on the fact that the quantity $Q_T$ of diesel fuel flowing from the pump P, governor G and throttle assembly TC is arranged to be exactly the same in dual-fuel operation as it is on 100% diesel single fuel operation although the amount injected into the engine is reduced in the dual-fuel mode. In this way, the pressure $P_S$, measured at a position directly after the throttle control TC and before the variable restrictors SRA and SRB has the same magnitude and variation when running on dual-fuel as when running on 100% diesel. By measuring this pressure $P_S$ it can be determined how much fuel the engine requires for a particular engine condition.

To further illustrate the system operation a simple example is given below:

Suppose $Q_T$ maximum (i.e. maximum value of diesel fuel flow delivered by the fuel pump assembly) is 500 units of mass per unit time of diesel fuel with a pressure $P_S$ of 180 units when operating on 100% diesel. Also, suppose it is required to reduce the diesel fuel supply to the engine to 10% of the original quantity when converted to run on dual-fuel. From the basic relationship $Q_T = Q_A + Q_B$ the maximum pilot quantity of diesel fuel $Q_A$ injected into the engine through metering device M must have a value of 50 units of mass per unit time and the maximum quantity of fuel $Q_B$ fed to variable restrictor SRB in the reference pressure supply line return to the tank T has a value of 500−50=450 units of mass per unit time.

The flow coefficient of solenoid restrictor SRB, which is denoted as $CV_B$ in FIG. 4, can be calculated from the expression $$Q_B = CV_B \sqrt{\Delta p} \quad (\Delta p = \text{pressure drop}),$$

hence $\quad Q_B = CV_B \sqrt{P_S}$

-continued
$$CV_B = \frac{Q_B}{\sqrt{P_S}} = \frac{450}{\sqrt{180}} \text{ units}$$

and $CV_A$ (the flow coefficient of solenoid restrictor SRA) will have a value depending upon $CV_m$ (the flow coefficient of the metering device) and may be calculated from the expression $$CV_A = \frac{Q_A CV_m}{\sqrt{P_S} \ CV_m - Q_A}$$

hence $CV_A = \dfrac{50 \cdot CV_m}{\sqrt{180} \cdot CV_m - 50}$ units

While the values of flow coefficients $CV_A$ and $CV_B$ in the example above have been calculated based on $Q_T$ maximum, once set to deliver a certain percentage (10% in this example), this percentage will hold true for any value of $Q_T$ and $P_S$. $P_R$ is the rail pressure to the metering device M and may also be measured and taken into account by the electronic control means of the system.

This system has the ability to run on a range of percentage pilot diesel fuel settings from 0% ($CV_A=0$, $CV_B=CV_m$) to almost 100% ($CV_A=CV_m$, $CV_B=0$), this percentage setting being set by driving the solenoids SRA and SRB with the correct mark/space ratio waveforms.

Although the solenoids SRA and SRB are pulsed at a constant frequency (experimentally found to be best between 20 and 40 cycles per second) and the outputs from these solenoids consist of "pulses of fuel flow" at this frequency, the hydraulic line connecting to the metering device M (comprising one or more injectors), and the inlet restrictor orifice $O_2$ of the metering device M act as a first order hydraulic filter to dampen out pressure fluctuations caused by these pulsing solenoids. Further, the engine itself acts as an integrator to these pressure or flow variations, alleviating or obviating any stability problems.

A further important feature of this system is that it gives the ability to alter the percentage pilot diesel fuel setting while the engine is operating, simply by adjusting the electrical waveform applied to the solenoid valves SRA and SRB to alter their flow coefficients. In this way it is possible to optimize the amount of pilot diesel fuel used in respect of emissions, horsepower and detonation limits.

Another feature of this system is that during the idle condition in the dual-fuel mode, most of the fuel required for idling is supplied by diesel, even though the solenoids SRA and SRB may be preset for a particular percentage pilot diesel fuel (10% for example). This is because the idle speed control is now a governed system, whereby if the idle speed is below the prescribed setting, the governor action increases fuel flow to increase idle speed to the precribed setting, overcoming the effects of solenoids SRA and SRB. If the idle speed is above the prescribed setting then the reverse happens.

By arranging for a small amount of the gas fuel to be introduced into the engine during idling, the engine can be made to run in this condition on a mixture of diesel oil fuel and gas while still retaining the idle governing action. This is an important feature, as without this governing action, the differences between a hot and cold engine, between summer and winter fuel, and the effect of the engine accessories cutting in and out, would all affect idle speed.

The major advantages of running on a diesel fuel/gas mixture at idle are firstly economic, especially when the engine may idle all night in extremely cold climates, and secondly by reducing the diesel supply at idle it may be possible to reduce carbonization within the engine which would again be advantageous, especially when the engine may need to idle for many hours at a time.

The other main advantages of this variable pilot diesel fuel system for dual-fuel engine conversions are that firstly overspeed governing is still maintained. If for some reason the gas metering system remains in an open position and the engine speed is allowed to rise in excess of engine limits, then the governor will eventually cut off completely the diesel fuel flow to the engine and thereby prevent engine damage. However, it must be stressed that this is not considered to be a "safe" condition and the probability of this problem occurring must be very small. Another advantage is that from a fitting or installation point of view it is very easy to install. A further advantage lies in a safety aspect since, as there are only two additional solenoids in the system, any failure of these solenoids in the closed position (solenoids very rarely fail in the open position) will not inhibit the engine operation on 100% diesel in any way.

Thus, to summarize, this further modified system described above has the ability to vary the percentage pilot diesel fuel used while the engine is in operation. The governing action at both idle and overspeed conditions are maintained. Switch-over from 100% diesel to dual-fuel operation is very easy to achieve, and in the event of solenoid SRA or SRB failure the engine may still be operated on 100% diesel.

Also, the system will fit all "Cummins" type of fuel systems and requires no fuel pump modification, and is easy to install. In contrast, for installing the systems of FIGS. 1 and 2, since only about 30% of all "Cummins" fuel pumps presently in use have a passageway that can readily be tapped into, without pump modification, between the governor G and throttle control TC, for the other 70% or so, of "Cummins" fuel pumps substantial pump modifications would be needed to achieve this.

Figure 3:
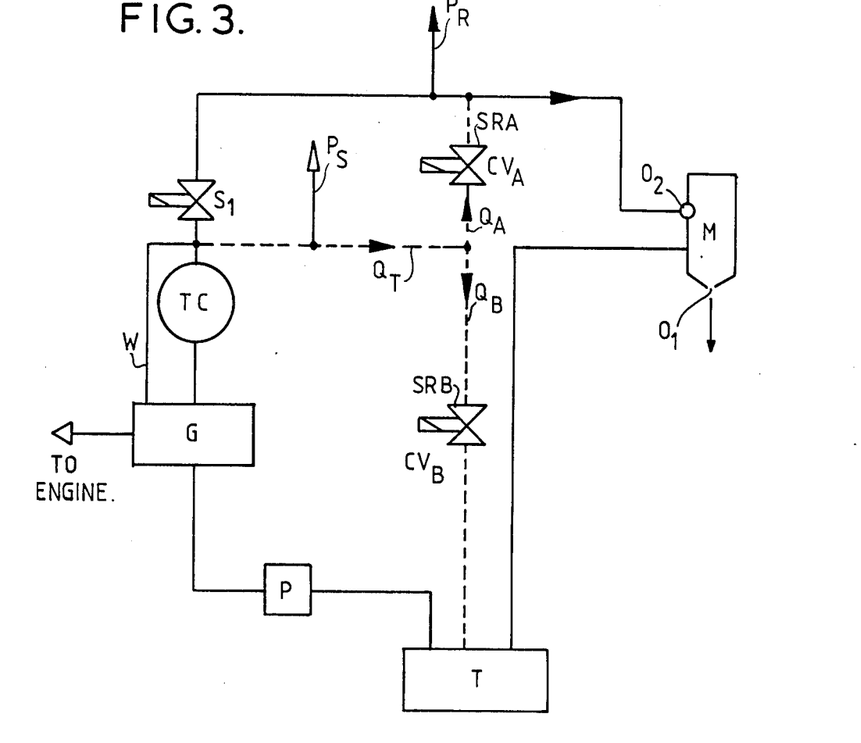
FIG. 3 shows a further modified version of the fuel oil injection supply system.

In using the system of FIG. 3, solenoids SRA and SRB are driven from an electronic control unit which is preferably arranged to sense a particular changing engine parameter and to relate this to a required percentage pilot diesel fuel setting to optimize for engine emissions, horsepower output and detonation limits. The system is so designed as to be programmable so that an "electronic curve" which relates a changing engine parameter to percentage pilot diesel fuel setting, at various points along this parameter axis, may be contained in an electronic memory chip. This means that if one engine requires a slightly different pilot diesel fuel curve from another, all that needs to be changed is an electronic chip (which contains this curve).

Figure 5:
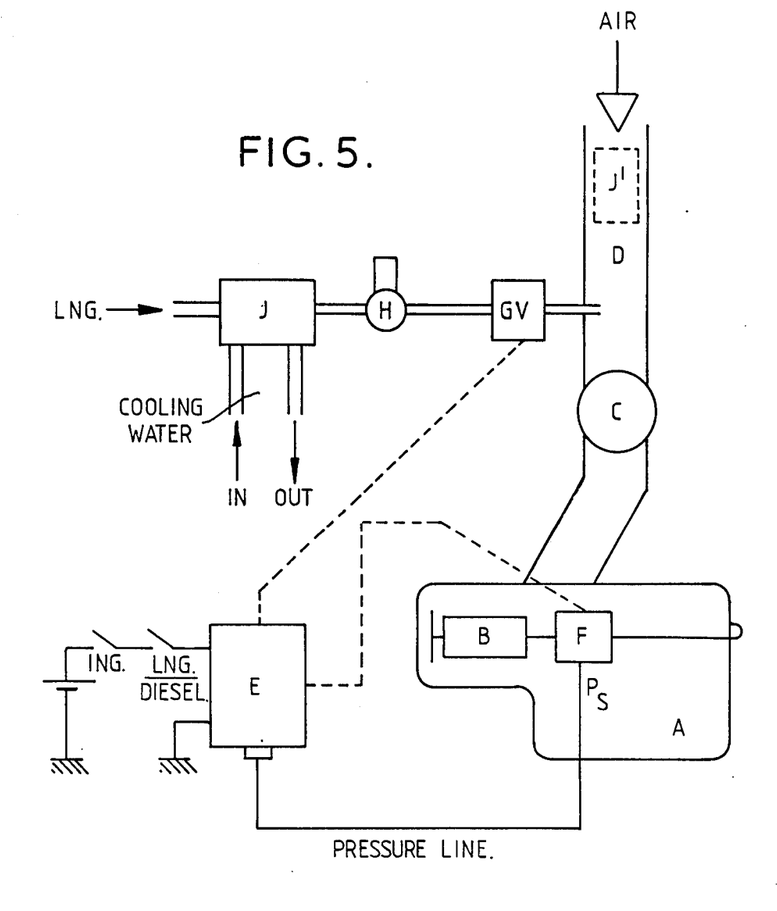
FIG. 5 shows an overall view of the engine, fuel supply systems and control system.

FIG. 5 shows a basic liquified natural gas (LNG) conversion arrangement developed for a "Cummins" engine using the system of FIG. 3, but it could also represent any injection engine with a fuel system in accordance with the present invention and, in particular, it is applicable in substantially the form indicated to the installation of systems in accordance with FIGS. 1 and 2. The simplified diagram of FIG. 5 should now be self-explanatory from the table of letter designations listed below:

TABLE

| | |
|---|---|
| A = | DIESEL ENGINE |
| B = | ENGINE FUEL PUMP/GOVERNOR/THROTTLE ASSEMBLY |
| C = | ENGINE TURBOCHARGER |
| D = | INLET MANIFOLD |
| E = | ELECTRONIC UNIT |
| F = | DIESEL METERING BLOCK (contains SRA & SRB) |
| GV = | GAS METERING VALVE |
| H = | CONSTANT PRESSURE REGULATOR |
| J = | LNG VAPORIZER (water heated) |
| J' = | ALTERNATIVE LNG VAPORIZER (air heated) |

The electronic control unit E measures the fuel pressure $P_S$ and operates the LNG gas metering valve gas flow regulator GV accordingly. The gas is introduced into the inlet air stream just before the turbocharger C. The inlet air system is not throttled in any way and by simply increasing the gas flow into the inlet air stream, engine output also increases. The air entering the engine is not throttled, therefore the amount of air per inlet stroke is approximately constant; this means that the engine operates with a very wide range of gas/air ratios. This is possible because when the pilot diesel fuel is injected into the combustion chamber it ignites, thereby increasing both the temperature and pressure in the combustion chamber. During this temperature and pressure rise a point will be reached where the gas/air mixture will support combustion since the flammability limits of natural gas in air become wider as both temperature and pressure increases. Thus, a mixture of gas/air too lean to support combustion under ambient or atmospheric temperature and pressure will in fact burn inside a diesel engine combustion chamber as in the arrangement described.

However, in certain conditions some problems relating to very weak gas/air mixtures may tend to arise when running on dual-fuel, but the variable pilot fuel arrangement described above may enable these to be overcome or alleviated by the expedient of increasing the amount of pilot diesel fuel injected into the combustion chamber. It could indeed be quite possible that on some engines, the first 15% for example of maximum engine power output may need to be supplied by 100% diesel. This variable pilot diesel system allows enough flexibility to achieve this.

Another problem which may arise in running dual-fuel engines is that of the gas/air mixture becoming too rich, leading to pre-ignition and/or detonation. Running at leaner gas/air mixtures may eliminate this problem, but for a given gas/air mixture, the engine's likelihood to detonate or pre-ignite increases with increasing effective compression ratio and also with increasing inlet air temperature. When an engine such as a "Cummins" NTC 290 for example is turbocharged and not aftercooled then the effective compression ratio and inlet air temperature are both quite high and may pose problems if successful operation on dual-fuel is to be achieved.

However, in such cases use of the variable pilot diesel system described may help to overcome the problems of detonation/pre-ignition without sacrificing engine performance. To achieve this, the maximum gas/air ratio in the combustion chamber(s) can be effectively limited to a safe level that avoids detonation, at which point the pilot diesel fuel quantity is arranged to be just sufficient to ignite the gas/air mixture. If, for a particular engine, the manufacturer's maximum engine output is not realized when running at this particular gas/air mixture, then additional pilot diesel fuel may be used, by varying the percentage thereof, to supply the extra engine horsepower needed to meet the manufacturer's maximum power specification.

Another way of reducing the problems associated with detonation and/or pre-ignition may be to cool the intake air stream to the engine. Lowering the inlet air temperature can markedly reduce the engine's onset of detonation/pre-ignition for a given gas/air mixture with LNG as the engine fuel; such lowering of the intake air temperature is possible by using the inlet air stream to vaporize the LNG in a custom-designed heat exchanger, as indicated in FIG. 5.

So to sum up, it is believed that engines when running on dual-fuel (LNG and diesel-fuel) can exhibit several problems associated with too weak or too rich a gas/air mixture. In the case of too weak a gas/air mixture, the mixture may not burn efficiently but increasing the amount of pilot diesel fuel may alleviate this problem. The detonation and/or pre-ignition problem associated with too rich a gas/air mixture may be overcome by limiting the maximum gas/air mixture ratio to a safe limit and supplying additional BTU's to the engine (if the maximum manufacturer's engine output has not been achieved) from the pilot diesel fuel. The electronic control may be programmed to take account of either or both these problems.

FIG. 6 has been provided for further clarification showing in more detail a basic "Cummins" fuel system before adaption. Specific reference to detailed features is not given here since this can be gained by reference to any appropriate text book.

Embodiments of the invention are particularly advantageous where the engine runs on natural gas. This is because the world's reserves of natural gas are estimated at being far greater than the world's oil reserves. Additionally, natural gas can be manufactured fairly easily from animal and vegetable waste, for example. Many countries have natural gas supplies but no oil and running engines on natural gas instead of fuel oil as the main fuel should result in reduction of noise pollution, lower exhaust emission, as well as increasing the overhaul life of major system components and creating further economic advantages.

Embodiments of the invention allow existing fuel injection engines to be adapted quickly, easily and at low cost to run efficiently as a dual-fuel engine, while making full use of the original components, controls, empirical results and know how of the existing fuel injection systems.

We claim:

1. In a dual-fuel engine having at least one combustion chamber and a fuel oil injection supply system and being adapted to run on fuel oil alone in a single-fuel mode and in a dual-fuel mode on fuel oil and gas, the combination comprising:
   (a) a reference supply line located in the fuel oil injection supply system of the engine for carrying the fuel oil,
   (b) means responsive to the fuel oil pressure developed in the reference supply line for automatically controlling the flow of fuel oil and gas to said combustion chamber.

2. A dual-fuel engine as defined in claim 1 wherein the fuel oil injection supply system includes a bypass line to control the injection of pilot shots of fuel oil to said combustion chamber.

3. A dual-fuel engine as defined in claim 1 wherein during the dual-fuel mode of operation of the engine, the responsive means controls both the flow of fuel oil and gas to the combustion chamber.

4. A method of adapting a fuel injection engine having at least one combustion chamber, a supply line for a gaseous main fuel, and an existing fuel oil injection supply system including a supply line for a fuel oil, said method comprising:
(a) modifying the existing fuel oil injection supply system by providing a reference supply line in the fuel oil supply line for carrying fuel oil in which pressure developed therein is determined to control the amount of the main fuel supplied to the combustion chamber relative to said pressure, and
(b) modifying said existing fuel oil injection supply system by feeding pilot shots of the fuel oil to the combustion chamber to ignite the gaseous main fuel supplied to said combustion chamber.

5. A method as defined in claim 4 wherein said existing fuel oil injection supply system modifying step includes sensing the pressure developed in the fuel oil injection supply system and changing the amount of main fuel supplied to said combustion chamber in response to the change of pressure developed in said fuel oil injection supply system.

6. A method of adapting a fuel injection engine having at least one combustion chamber and a fuel oil injection supply system and being effective to run in a dual-fuel mode on a gaseous main fuel and also on fuel oil, said method comprising:
(a) providing a reference supply in the existing fuel oil injection supply system,
(b) during the dual-fuel mode of operation of the engine, arranging for at least part of the existing fuel oil injection supply control system to be usable to control the amount of main fuel supplied to the combustion chamber of the engine so that in use in the dual-fuel mode the amount of main fuel supplied to said combustion chamber is controlled by the pressure developed in said reference supply line, and
(c) during the dual-fuel mode of operation of the engine, arranging for at least part of said existing fuel oil injection supply control system to be usable to provide pilot shots of fuel oil which are fed to the combustion chamber to ignite the main fuel supplied to said combustion chamber.

7. A method as defined in claim 6 wherein said existing fuel oil injection supply system is modified by providing a by-pass supply line.

8. A method as defined in claim 7 wherein a flow restrictor is provided in at least one of said reference supply and said by-pass supply lines.

9. A method as defined in claim 8 wherein the flow restrictor is a variable flow restrictor.

10. A method as defined in claim 8 wherein the reference supply line and by-pass supply line shar a common branch.

11. A method as defined in claim 6 wherein the engine includes an existing control system used in the dual-fuel mode and the control system comprises an existing governor control which is run from a moving part of the engine.

12. A method as defined in claim 6 wherein the engine includes an existing control system having an existing throttle control used in the dual-fuel mode.

13. A method as defined in claim 6 wherein the engine includes an existing control system which is used in the dual-fuel mode and comprises an existing fuel oil metering device.

14. A method as defined in claim 6 wherein the engine includes an existing control system which is used in the dual-fuel mode and comprises an existing solenoid valve device.

15. A method as defined in claim 6 wherein the engine is a "Cumins" fuel injection engine.

16. A method as defined in claim 6 wherein the engine is permanently adapted to a dual-fuel system.

17. A method as defined in claim 6 wherein a selection control is effective to switch the engine from a single-fuel mode to a dual-fuel mode at will.

18. A dual-fuel fuel oil injection engine comprising:
(a) a fuel oil injection supply line to at least one combustion chamber of the engine,
(b) the fuel oil injection supply line being connected into a fuel oil circulatory system having a fuel oil throttle control of the engine and a fuel oil reference supply line connected downstream of the throttle control,
(c) the reference supply line including a flow restrictor,
(d) sensor means responsive to pressure in the reference supply line,
(e) a gaseous fuel supply system including gaseous fuel supply regulator means,
(f) means for injecting pilot shots of fuel oil into said combustion chamber in synchronized manner from said injection supply line, and
(g) means for sensing the pressure in the reference supply line between the throttle control and flow restrictor as said pressure varies according to engine speed and throttle control setting, to control the setting of said regulator means and thereby vary the amount of gaseous fuel supplied to said combustion chamber for ignition by the pilot shots of fuel oil.

19. An engine as defined in claim 18 wherein the flow restrictor is a variable flow restrictor.

20. An engine as defined in claim 18 or claim 19 wherein the fuel oil injection supply line includes a second flow restrictor.

21. An engine as defined in claim 20 wherein the second flow restrictor is a variable restrictor.

22. An engine as defined in claim 21 wherein the flow restrictors comprise pulsed solenoid valves.

23. An engine as defined in claim 18 wherein the engine includes a selection control adapted to run the engine both in a dual-fuel mode and in a single-fuel mode.

24. A dual-fuel fuel oil injection engine adapted for selective running on the fuel oil as a sole fuel in a single-fuel mode or on fuel oil and on gas in a dual-fuel mode, said engine comprising:
(a) circulatory fuel oil supply system,
(b) pump means to circulate the fuel oil around the supply system,
(c) an engine driven governor control connected in said fuel oil supply system upstream of a throttle control which is in turn upstream of a first flow control valve which is in turn upstream of a metering device for metering the amount of fuel oil injected into one or more combustion chambers of the engine, (d) when said first flow control valve is open, in use fuel oil is supplied to the metering device under pressure which is a function of the governor control speed and of the throttle control setting, (e) means for controlling the amount of fuel oil injected into said combustion chamber or chambers in response to said pressure and upon engine speed during the single-fuel mode of the engine, (f) the circulatory fuel oil supply system including a by-pass supply line having a second flow control valve, (g) said by-pass supply line by-passes the first flow control valve to allow fuel to flow through to said metering device when said first flow control valve is closed and when the second flow control valve is opened for running the engine in its dual-fuel mode, (h) the circulatory fuel oil supply system further including a reference supply line connected from a point downstream of the throttle control to a point downstream of the metering device, (i) said reference supply line including a third flow control valve and metering device mimic means operative in the dual-fuel mode such that said mimic means is effective to mimic or simulate in the reference supply line the pressure conditions set up downstream of the first flow control valve by the metering device when operating in the single-fuel mode, and (j) sensor means responsive to the pressure in the reference supply line and arranged to control in accordance with said pressure the amount of gas supplied to said combustion chamber or chambers, during the dual-fuel mode, for ignition by pilot fuel oil shots injected by the by-pass line and through the metering device.

25. A method of adapting a diesel engine to run as a dual-fuel engine, said diesel engine being of a type which has a circulatory fuel oil injection supply system and having an engine driven governor control arranged to vary the pressure in the circulatory fuel oil injection supply system in accordance with engine speed, said governor control being connected into the circulatory system upstream of a throttle control and a first valve means, said first valve means being operative to allow fuel oil to be supplied under pressure to a metering device of the engine which injects fuel oil into a combustion chamber or chambers of the engine, and said pressure being a function of the engine speed (by way of the governor control) and of the throttle setting so that the greater the throttle setting, the more fuel oil is injected into the combustion chamber or chambers, said method comprising:

(a) installing a by-pass line including second valve means in the circulatory supply system to by-pass the location of the first valve means in the supply system so that with the second valve means operative fuel oil can pass through said by-pass line to the metering device of the engine to provide pilot shots of fuel oil in the dual-fuel mode of operation, (b) installing downstream of the throttle control and upstream of the location of the first valve means a reference supply line including third valve means and metering device mimic means, (c) said mimic means, during dual-fuel operation of the engine, mimics the varying pressure conditions developed at the metering device which previously took place while running the diesel engine before adaptation to a dual-fuel engine, and (d) connecting the diesel engine to a gas supply through gas supply control means arranged to be responsive to the pressure developed in the reference supply line in the dual-fuel mode thereby to control the amount of gas fed to the combustion chamber or chambers for ignition by the pilot fuel oil injected therein.

26. A method as defined in claim 25 wherein the engine is permanently adapted to a dual-fuel system.

27. A method as defined in claim 26 wherein the first valve means is disconnected from its position in the circulatory supply system before adaptation and used as one of the second and third valve means.

28. A method as defined in claim 26 wherein the adaptation includes a selection control so that the diesel engine is adapted to be switched from a single-fuel mode to a dual-fuel mode at will.

29. A method as defined in claim 28 wherein the engine includes a weep-line for the fuel oil which is operative during tick-over or idling in the single-fuel mode,
the weep-line being rendered inoperative during speed above tick-over.

30. A method as defined in claim 29 wherein the weep-line is between the first valve means and the governor control.

31. A method of adapting a single-fuel mode fuel oil injection engine in which the amount of fuel oil injected into the engine varies with the pressure in a fuel oil supply line of a fuel oil circulatory system, said pressure varying in accordance with a throttle control setting and the fuel oil being injected by a metering devide which meters different amounts of fuel oil into a combustion chamber or chambers of the engine in accordance with the said pressure in the fuel oil supply line, said method comprising:

(a) adapting the engine to run in a dual-fuel mode by providing means for said fuel oil to be supplied to the metering device through alternative flow control means operative in the dual-fuel mode and by connecting into the circulatory system a reference supply line which is adapted to provide for close mimicking in the dual-fuel mode by the effect of the fuel flow constraints imposed by the metering device in the single-fuel mode, and (b) utilizing the pressure in the reference supply line to control the amount of gas supplied to the combustion chamber or chambers for ignition by pilot shots of fuel oil fed by the metering device into said chamber or chambers and supplied by said alternative flow control means so that the engine is adapted to run in a dual-fuel mode.

32. A dual-fuel fuel oil injection engine comprising:

(a) a fuel oil injection supply line to one or more combustion chambers of the engine, (b) the fuel oil injection supply line being connected into a fuel oil circulatory system downstream of a fuel oil throttle control of the engine, (c) a fuel oil reference supply line connected downstream of the throttle control and a part of the circulatory system, (d) a flow restrictor connected in the reference supply line, (e) means for injecting pilot shots of fuel oil into said one or more combustion chambers in synchronized manner by pump means wherein the pressure in the reference supply line varies according to engine speed and throttle control setting, and (f) means for sensing the varying pressure in the reference supply line between the throttle control and restrictor to vary the amount of gas supplied to said combustion chamber or chambers for ignition by the pilot shots of fuel oil.

33. An engine as defined in claim 32 wherein
the flow restrictor is a variable restrictor.

34. An engine as defined in claim 32 or claim 33 wherein
a second flow restrictor is located in the injection supply line.

35. An engine as defined in claim 34 wherein
the second flow restrictor is variable.

36. A dual-fuel oil injection engine adapted for selective running on the fuel oil as the sole fuel in a single-fuel mode or on fuel oil and on gas simultaneously in a dual-fuel mode, said engine comprising:

(a) a circulatory fuel oil supply system, (b) pump means to circulate the fuel oil around the supply system, (c) a governor control drivable from a moving part of the engine and connected in said fuel oil supply system upstream of a throttle control which is in turn upstream of a first solenoid valve which is in turn upstream of a metering device for metering the amount of fuel oil injected into one or more combustion chambers of the engine, (d) said first solenoid valve being effective to supply fuel oil to the metering device under pressure which is a function of the governor control speed and of the throttle control setting, (e) means for injecting an amount of fuel oil into said combustion chamber or chambers dependent upon said pressure and upon engine speed during the single-fuel mode of the engine, (f) the circulatory fuel oil supply system including a by-pass line havine a second solenoid valve and being connected downstream of the throttle control but upstream of the first solenoid valve, and downstream of the first solenoid valve and upstream of the metering device, to allow fuel to flow through the by-pass line by-passing the first solenoid valve when said first solenoid valve is shut-off and when the second solenoid valve in the by-pass line is operative while running the engine in its dual-fuel mode, (g) a reference supply line having a third solenoid valve and being connected downstream of the throttle control and downstream of the metering device, (h) said second and third solenoid valves providing variable flow restrictors and being electrically pulsable in cooperative manner, (i) the third solenoid valve providing metering device mimic means which in use in the dual-fuel mode is effective to produce mimicking of the pressure conditions set up by the metering device in the single-fuel mode, (j) the reference supply line being connected to sensor means responsive to the pressure in the reference supply line to thereby control the amount of gas supplied to said combustion chamber or chambers, when said third solenoid valve is operative during the dual-fuel mode, for ignition by fuel oil injected by the by-pass line when the second solenoid valve is operative and through the metering device, (k) when the engine is in the single-fuel mode, the first solenoid valve is operative with the second and third solenoid valves shut off, and during the dual-fuel mode, the engine operates with the first solenoid valve shut off and the second and third solenoid valves operative, (l) the second solenoid valve being pulsable to allow a variable amount of fuel oil to be injected into said combustion chamber or chambers to vary the ratio of gas supplied to the chamber or chambers to fuel oil, and (m) the third solenoid valve being pulsable in co-operation therewith to maintain said mimicking.

37. A method of adapting a diesel engine to run as a dual-fuel engine, said diesel engine being of a type which has a circulatory fuel oil injection supply system and being of a type having an engine driven governor control arranged to vary the pressure in the circulatory fuel oil injection supply system in accordance with engine speed, said governor control being connected into the circulatory system upstream of a throttle control and a first valve means, said first valve means being operative to allow fuel oil to be supplied under pressure to a metering device of the engine which injects fuel oil into a combustion chamber or chambers of the engine, and said pressure being a function of the engine speed (by way of the govnernor control) and of the throttle setting so that the greater the throttle setting the more fuel oil is injected into the combustion chamber or chambers, said method comprising:

(a) installing a by-pass line and second valve means in the circulatory supply system so that with the first valve means shut-off and with the second valve means operative fuel oil can by-pass the first valve means to the metering device of the engine, (b) installing a reference supply line downstream of the throttle control and upstream of the first valve means and installing third valve means providing metering device mimic means which, during dual-fuel operation of the engine, is effective to mimic the varying pressure conditions developed at the metering device which previously would have taken place while running the diesel engine before adaptation to a dual-fuel engine, (c) said second valve means providing a variable flow restrictor and being electrically pulsable to vary the amount of fuel oil fed to said combustion chamber or chambers and said third valve means also providing a variable restrictor and being pulsable in co-operation with said second valve means, (d) connecting the diesel engine to a gas supply through gas supply control means arranged to be responsive to the pressure developed in the reference supply line in the dual-fuel mode thereby to control the amount of gas fed to the combustion chamber or chambers for ignition by the fuel oil injection therein so that the diesel engine runs as a dual-fuel engine.

38. A method as defined in claim 37 wherein
the diesel engine is permanently adapted to a dual-fuel system.

39. A method as defined in claim 38 wherein the first valve means is disconnected from its position in the circulatory supply system before adaptation and used as one of the second and third valve means.

40. A method as defined in claim 37 wherein
the engine includes a selection control for switching the diesel engine from a single-fuel mode to a dual-fuel mode at will.

41. A method of adapting a single-fuel mode fuel oil injection engine in which the amount of fuel oil injected into the engine varies with the pressure in a fuel oil supply line of a fuel oil circulatory system which includes a shut-off valve, said pressure varying in accordance with a throttle control setting and the fuel oil being injected by a metering device which meters different amounts of fuel oil into a combustion chamber or chambers of the engine in accordance with the pressure in the supply line, said method comprising:

(a) adapting the engine to run in a dual-fuel mode by providing bypass means to allow the fuel oil to bypass the shut-off valve,
(b) connecting a reference supply line into the circulatory system which is arranged to produce a close mimicking in the duel-fuel mode of the effect of the fluid flow pressure constraints caused by the metering device in the single-fuel mode, and
(c) utilizing the pressure in the reference supply line to control the amount of gas supplied to the combustion chamber or chambers for ignition by pilot shots of fuel oil fed by the metering device into said chamber or chambers and by said by-pass means so that the engine is adapted to run in a dual-fuel mode.

42. A method as defined in claim 41 wherein
the engine is arranged selectively to run in the dual-fuel mode and single-fuel mode.

* * * * *

UNITED STATES PATENT AND TRADEMARK OFFICE
CERTIFICATE OF CORRECTION

PATENT NO. : 4,619,240

DATED : October 28, 1986

INVENTOR(S) : Timothy J. Bedford et al

It is certified that error appears in the above-identified patent and that said Letters Patent is hereby corrected as shown below:

Assignee; Delete -- Anker Gram & Associates, Ltd. -- and insert therefor -- Cryogas Engineering, Ltd. --

Signed and Sealed this

Tenth Day of February, 1987

Attest:

DONALD J. QUIGG

*Attesting Officer*  *Commissioner of Patents and Trademarks*